United States Patent [19]
Park et al.

[11] Patent Number: 5,467,234
[45] Date of Patent: Nov. 14, 1995

[54] IDLER CONTROLLING APPARATUS OF A MAGNETIC RECORDING/REPRODUCING APPARATUS

[75] Inventors: Gun C. Park; Do Y. Choi; Young H. Cho, all of Suwon, Rep. of Korea

[73] Assignee: Samsung Electronics Co., Ltd., Kyungki-Do, Rep. of Korea

[21] Appl. No.: 280,611

[22] Filed: Jul. 26, 1994

[30] Foreign Application Priority Data

Jul. 26, 1993 [KR] Rep. of Korea .................. 93-14174

[51] Int. Cl.⁶ .......................... G11B 5/027; G11B 15/00
[52] U.S. Cl. ............................. 360/85; 360/96.6
[58] Field of Search ................. 360/85, 95–96.6

[56] References Cited

U.S. PATENT DOCUMENTS

| | | | |
|---|---|---|---|
| 4,704,643 | 11/1987 | Matsuoka et al. | 360/95 |
| 4,930,720 | 6/1990 | Hwang | 360/96.5 |
| 5,295,639 | 3/1994 | Kurokawa et al. | 360/96.3 |

FOREIGN PATENT DOCUMENTS

WO9321631  10/1993  WIPO.

*Primary Examiner*—John H. Wolff
*Assistant Examiner*—Brian E. Miller
*Attorney, Agent, or Firm*—Sughrue, Mion, Zinn, Macpeak & Seas

[57] ABSTRACT

In a magnetic tape recording/reproducing apparatus, an idler moves an idler gear selectively between a supply reel and a take up reel to transfer power respectively to the reels. During loading of the tape of a cassette tape, an upper chassis, with the tape cassette and drum, is seated on a lower chassis, with the loading and travelling gearing apparatus. During seating operation, the idler is held in a central position by an idler cam having a cam surface to be out of the way of the components on the upper chassis, thereby eliminating interference with the seating operation. During normal tape running operations, the cam surface controls the movement of the idler.

1 Claim, 4 Drawing Sheets

IDLER CONTROLLING APPARATUS OF A MAGNETIC RECORDING/REPRODUCING APPARATUS

BACKGROUND OF THE INVENTION

1. Field of the Invention

The present invention relates to a loading system and a traveling system for a magnetic recording/reproducing device. More particularly, the invention relates to an idler controlling apparatus in a magnetic recording/reproducing device, wherein the rotational force of a capstan motor transmitted to a travelling system in the device is selectively supplied to a supply reel and a take-up reel for controlling the travel of a magnetic tape.

2. Description of Prior Devices

Generally, magnetic recording/reproducing devices, which record and reproduce signals on and from a magnetic tape travelling along a predetermined path, include a drum and read/write heads on a deck, a tape transporting system for transferring the magnetic tape seated on a supply reel and a take-up reel along the predetermined path, a tape loading system for applying the magnetic tape tightly against the drum, and elements for driving the reels. Generally a magnetic recording/reproducing device includes a loading motor for driving the tape loading system and a capstan motor for driving the tape travelling system and the reels. The existence of two motors places limits on the minimization of the size and weight of the device.

A recent trend is to provide smaller and lighter magnetic recording/reproducing devices, such as those which use the widely available 8 mm tape cassette. One such small, lightweight device includes a tape cassette holder into which a tape cassette is inserted, a slider for moving the cassette holder horizontally backward and forward, and an upper chassis on which a rotary drum is installed. The holder, slider and upper chassis are located between an eject lever and a lower chassis. The holder is closed on the slider, and the magnetic tape from the cassette is first loaded onto the drum by the slider moving horizontally toward the drum. The drum thereby is placed wholly within the internal space of the tape cassette while the remainder of the loading operation takes place and remains within the internal space of the cassette during read/record operations. This results in a highly miniaturized tape recorder/reproducer. Examples of a cassette and tape recorder/reproducer of the latter type are described in WO 93/21631, published Oct. 28, 1993, and copending U.S. patent application 08/093,400, now U.S. Pat. No. 5,427,326 filed Aug. 4, 1993, assigned to the assignee herein, both of which are incorporated by reference herein.

A portion of such a device, to the extent relevant to the invention herein will be briefly described below with reference to FIG. 1, which illustrates a loading system and travelling system installed on a main (or lower) chassis 1 of a small/lightweight magnetic recording/reproducing apparatus, disclosed in Korean Patent Application No. 93-5016, which is incorporated herein by reference. The power provided by a capstan motor 2 is selectively supplied to the travelling system and the loading system to control both the running of the tape and the loading of the tape. The use of a single motor for both functions permits the deck to be small and light weight.

The capstan motor 2, which rotates in a forward or reverse direction in accordance with a mode control signal, is mounted on one side of the main chassis 1. A lever 3 is provided with an upper end anchored to a bracket that is attached to the chassis 1. The bracket is not shown in the drawing. A transmission gear 4, which rotates around a shaft 4a and is connected to the lower end of lever 3, meshes with gear 2a of the capstan motor 2. The gear 4 pivots to the right or the left under control of a plunger and in accordance with the rotational direction of the capstan motor 2 as disclosed in U.S. patent application No. 08/280,457, filed on the same date herewith, entitled "Power Transferring Device for Magnetic Recording and Reproducing Apparatus," and assigned to the assignee herein (corresponding to Korean Patent Application 93-14671 filed Jul. 30, 1993). When pivoted to the fight, the gear 4 transfers the rotational power of the capstan motor to gear 12, which is part of the tape travelling system. When pivoted to the left, the gear 4 transfers the power of capstan motor 2 to gear 5, which is part of the tape loading system.

The magnetic tape loading system includes gear 5, which is selectively in contact with gear 4, and a series of small gears 6 to 10. Gear 10 meshes with a ring gear 11, which operates in a well known manner to load the tape onto the rotary drum. The ring gear 11 is mounted on the main chassis 1.

The magnetic tape travelling system includes the second gear 12, which is selectively in contact with gear 4, a pulley 12a formed on second gear 12, a driven gear 13 and a belt 14. The driven gear 13 is brought into gearing contact with an idler gear 16 connected through the upper portion of a lever 15, so that the idler gear 16 swings to the right or to the left in accordance with the rotational direction of the capstan motor 2 to supply the rotational force to a supply reel or a take-up reel (not shown), respectively, installed on an upper chassis (not shown). The idler gear 16 is directly brought into gearing relationship with a gear (not shown) formed along the outer circumference of the supply reel, and the take-up reel is connected to a gear (not shown) along the outer circumference of the take-up reel via all auxiliary gear (not shown) to thereby transmit the rotational force of the capstan motor 2.

A cam gear 17 rotating around a shaft 17a is installed to mesh with the ring gear 11. A cam groove 17b is formed in the upper plane of the cam gear 17, and a pin 18b of a first lever 18 follows the cam groove. The first lever 18 pivots about a shaft 18a. The pin 18b projecting on the lower side of the first lever 18 fits into the cam groove 17b of the cam gear 17. A pin 18c at the lower end of the first lever 18 fits into the end of a second lever 19, which is installed in the transversal direction. The elements 17, 18, and 19 operate a switch (not shown) in the device to eject the upper chassis from the lower chassis.

In FIG. 1, the position of the transmission gear 4 for selectively supplying the rotational force of the capstan motor 2 to the magnetic tape loading system and travelling system is controlled by a plunger (not illustrated). In more detail, the gear teeth 4b of the transmission gear 4 are brought into gearing contact with the first gear 5 when gear 4 is pivoted to the left to transmit the rotational force of the capstan motor 2 to the loading system. The gear teeth 4c of the transmission gear 4 are brought into gearing contact with the second gear 12 when the gear 4 is pivoted to the right to transmit the rotational force of the capstan motor 2 to the travelling system.

When the gear 4 pivots to the right, bringing gear teeth 4c into gearing contact with the gear 12 to transfer the rotational force of the capstan motor 2 to the travelling system, the idler gear 16 swings to the right or to the left, depending on the direction of rotation of the pulley 12a, to bring the idler gear 16 into gearing contact with gears associated with the supply reel or take-up reel. In this case, the idler lever 15 swings right to left around the shaft 13a and the gear 13b is brought into gearing contact with the idler gear 16 to pivot the idler gear 16, but there is a problem caused by the fact that the idler lever 15 and idler gear 16 are free to move.

The problem is that the freely moving idler lever 15 and gear 16 may interfere with the proper seating of the upper chassis on the main (lower chassis). As seen in the references mentioned above, in a magnetic recording/reproducing apparatus of the type described, there is an upper chassis and a lower chassis, and the upper chassis has to be moved onto and seated properly on the lower chassis for proper loading and operation. A freely moving idler gear may inhibit accurate seating of the upper chassis by coming into contact with components on the upper chassis during the seating operation.

SUMMARY OF THE INVENTION

It is an object of the present invention to solve the above-described problems by providing an idler controlling apparatus, wherein the idler is guided to pivot within a predetermined range to prevent the idler from contacting components of the upper chassis during seating of the upper chassis onto the main chassis.

To achieve the above object of the present invention, there is provided, in a magnetic recording/reproducing device, an idler controlling apparatus having a gear, which is driven in the forward and reverse directions by a driving source installed on a lower chassis, and an idler selectively brought into gearing contact with a supply reel and a take-up reel provided on an upper chassis during the forward and backward rotation of the driven gear for rotating the supply reel and take-up reel. Furthermore, the idler controlling apparatus includes an idler controlling unit which is operated by receiving the power from a cam gear operated by the driving source, so that the idler is guided to a central position when the upper chassis is being seated on the lower chassis, and the idler is guided to the right or to the left direction with respect to the central position during normal travelling operation of the magnetic tape after seating the upper chassis on the lower chassis, thereby selectively rotating the supply reel and take-up reel.

Preferably, the idler controlling unit includes an eject lever, which fits into a cam groove of a cam gear that is rotated during seating of the upper chassis and which is horizontally moved. In addition to the eject lever, the idler controlling unit is provided with an idler cam, which elastically swings around a shaft during the horizontal movement of the eject lever for guiding the idler to a central position and contacts a pin of the idler lever for controlling the right and left swings of the idler during the transport of the magnetic tape after the upper chassis is seated.

BRIEF DESCRIPTION OF THE DRAWINGS

The above objects and other advantages of the present invention will become more apparent from the following description of a preferred embodiment of the invention with reference to the attached drawings, in which.

DETAILED DESCRIPTION OF THE PREFERRED EMBODIMENT

Figure 1:
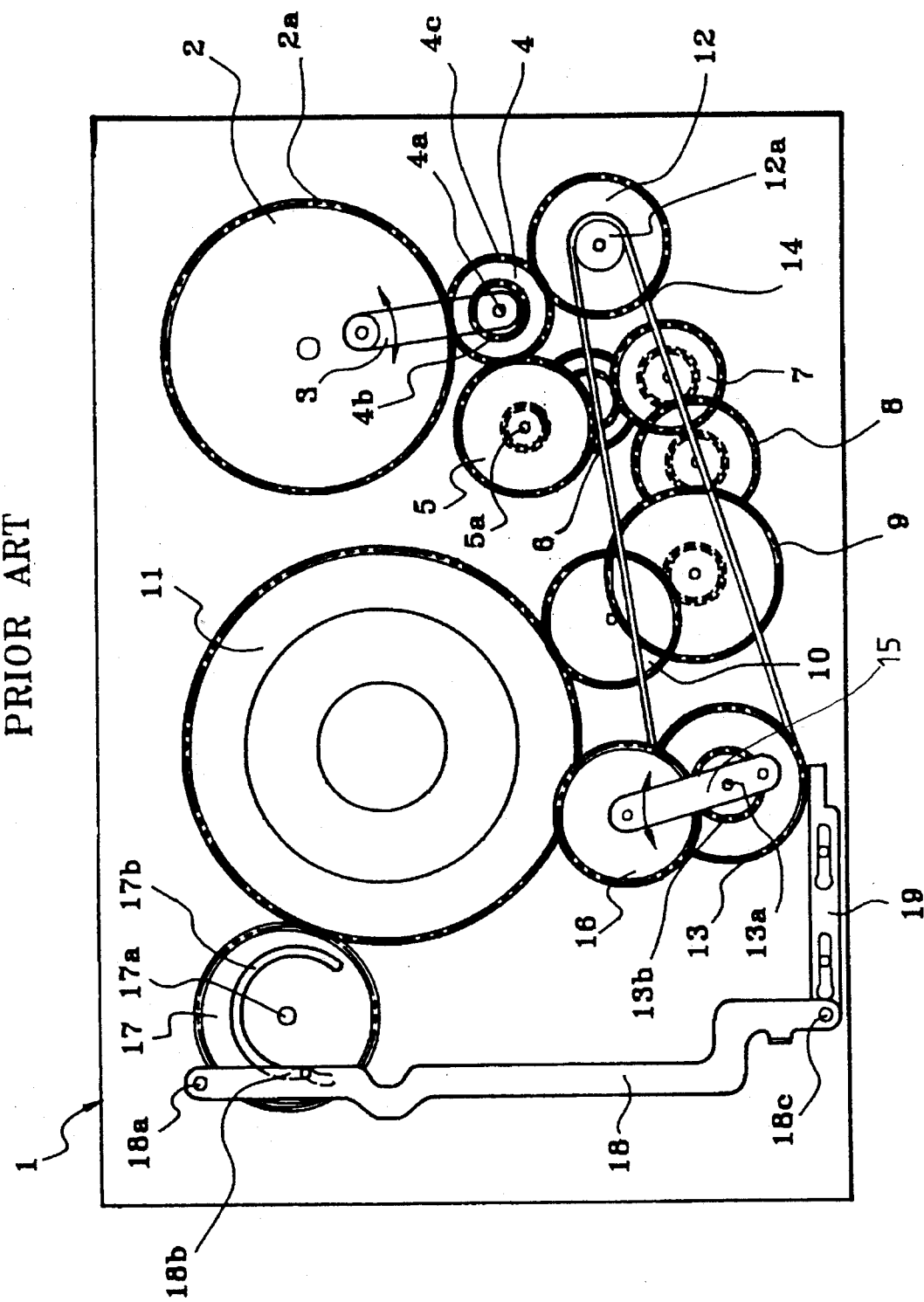
FIG. 1 is a plan view showing a loading system and a travelling system of a magnetic recording/reproducing apparatus to which the present invention is applied.
Figure 2:
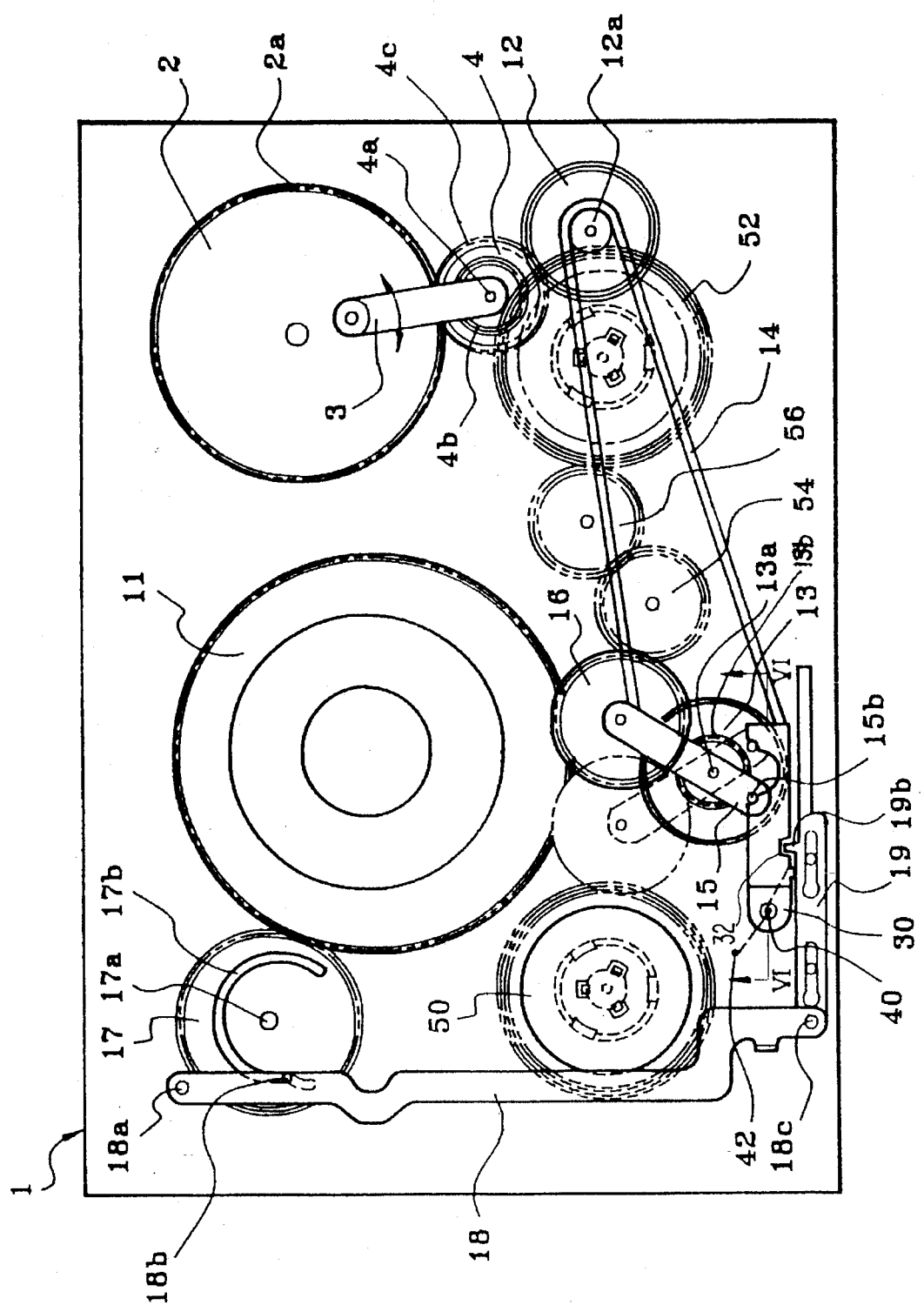
FIG. 2 is a plan view showing a loading system and a travelling system of a magnetic recording/reproducing apparatus provided with an idler controlling apparatus according to the present invention.

FIG. 2 illustrates only the travelling system portion of the magnetic recording/reproducing apparatus provided with an idler controlling apparatus according to the present invention. Most of the tape loading portion has been removed from the drawing for clarity. The same reference numerals as those shown in FIG. 1 designate the same parts, and thus a description of those parts will be omitted.

Figure 5:
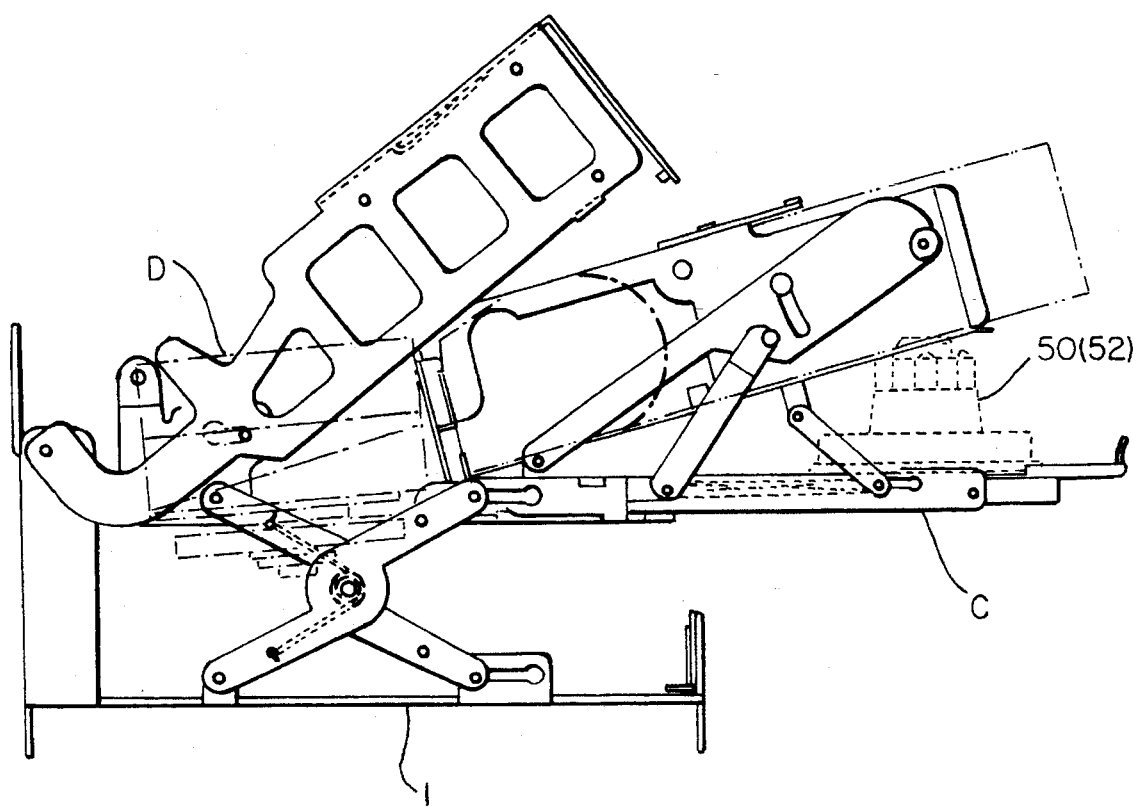
FIG. 5 is a side elevation view of the magnetic recording/reproducing apparatus according to the present invention.

FIG. 5 illustrates upper chassis C and main chassis 1.

Figure 3:
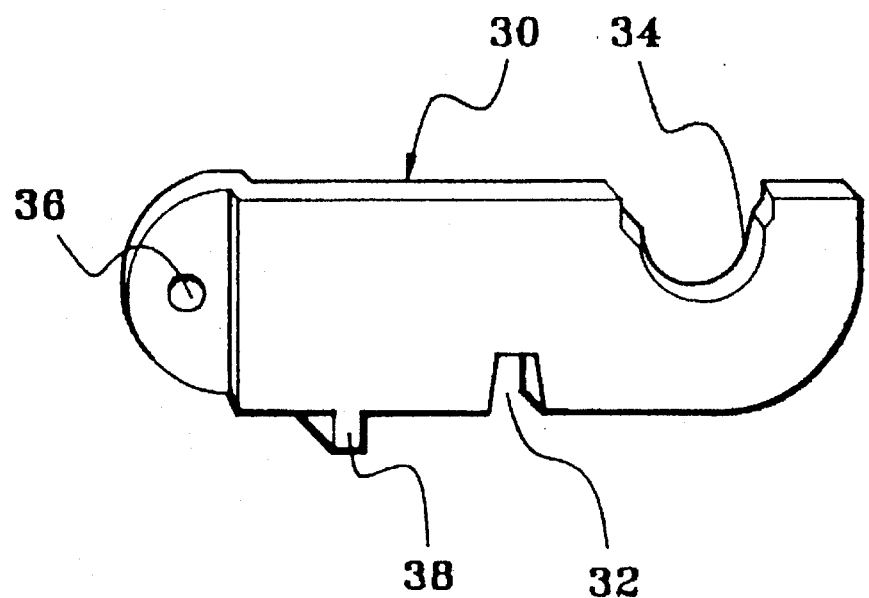
FIG. 3 is an extracted perspective view showing a principle portion of the idler controlling apparatus shown in FIG. 2.
Figure 4:
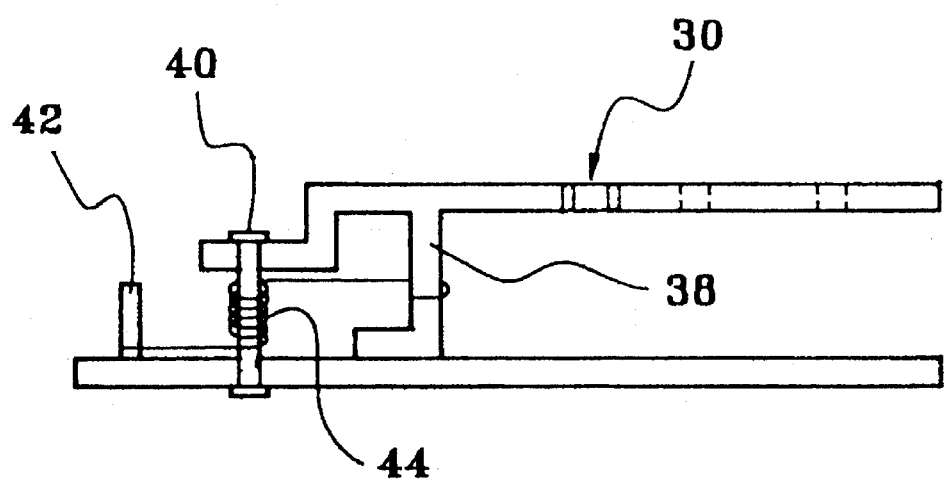
FIG. 4 is a sectional view showing the idler controlling apparatus taken along line IV—IV of FIG. 2.

As seen in FIG. 2, the ejecting lever 19 includes a projecting part 19b, which is inserted into a groove 32 formed in an idler cam 30, shown in detail in FIGS. 3 and 4. The idler cam 30 is formed of a thin plate and has a cam surface 34 in contact with cam follower pin 15b of the idler lever 15. The cam 30 is fixed to the main chassis 1 by a pin 40 via hole 36 in the cam 30. The groove 32 of the idler cam 30 contacts the projecting part 19b of the ejecting lever 19. A spring 44 is wound around pin 40 and is anchored at one end to a pin 42 and the other end to a hooking plate 38 of the cam 30. The spring 44 biases the idler cam clockwise about pin 40, resulting in projection 19b being in the groove 32.

In FIG. 2, reference numerals 50 and 52 respectively designate a supply reel and a take-up reel, and 54 and 56 are auxiliary gears for rotating the take-up reel.

In loading the magnetic tape onto the rotary drum D, the capstan motor 2 is rotated counter-clockwise. A plunger (not shown) shifts the transmission gear 4 toward the first gear 5 (FIG. 1), bringing the gear teeth 4b into gearing contact with the first gear 5. The ring gear 11 is rotated counter-clockwise via the plurality of gears 6 to 10 (FIG. 1). When the ring gear 11 is rotated as above, a cam gear 17 (FIG. 2) is rotated clockwise. (Note that in FIG. 2, the ring gear 11 and the cam gear 17 are shown at the end of their respective counter clockwise and clockwise rotations during the loading operation.)

Once the cam gear 17 begins to rotate, the follower pin 18b of the lever 18 moves within the groove 17b of cam gear 17 and thereby moves the lever 18 counter clockwise, as shown in the drawings, about the shaft 18a. This action of lever 18 moves eject lever 19 horizontally towards the right in the drawings. While performing the horizontal movement, the projecting part 19b pushes the idler cam 30 to cause it to pivot counterclockwise about shaft 40. This movement of the idler cam 30 causes the pin 15b of idler 15 to follow the cam surface 34, whereby the pin moves to the central part of the surface 34. As a result the idler 15 assumes a vertical position; i.e. a position perpendicular to the lever 19. This position is substantially held during the seating of the upper chassis on the lower chassis and therefore the idler 15 and idler gear 16 will not interfere with components on the upper chassis and will allow for proper seating.

During the loading of the magnetic tape, if the ring gear 11 is rotated counter-clockwise more than the above-stated case, the pin 18b of the lever 18 is guided along the cam groove 13b, so that the lever 18 now swings back clockwise, thereby bringing the projecting part 19b back to the left where it will again be seated in the groove 32 of the cam 30 again. Thus, the idler lever 15 is moved along the cam plane 34.

Meanwhile, in carrying out the travelling of the magnetic tape, the gears 4c of the transmission gear 4 are brought into gearing with a second gear 12 to rotate a driven gear 13 by means of a belt 14. Then, the take-up reel 52 and supply reel 50 are rotated in accordance with the forward and backward rotation of the capstan motor 2, thereby making the magnetic tape travel. In this case, the pin 15b of the idler lever 15 is guided by the cam plane 34 to enable accurate guiding thereof.

According to the idler controlling apparatus of the magnetic recording/reproducing apparatus as described above, an idler is centered to prevent contacting to lower components of an upper chassis when the upper chassis is seated on a main chassis, while the right to left pivot of the idler can be accurately controlled during travelling of the magnetic tape.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. In a magnetic recording/reproducing apparatus of the type having an upper chassis which is seated on a lower chassis for loading a cassette tape onto a drum, a driving source, a driving gear which is selectively driven in the forward and reverse directions by said driving source to thereby pivot an idler into selective gearing engagement with a supply reel and a take-up reel, respectively, provided on said upper chassis, and a cam gear means operated by said driving source, the improvement comprising:

idler controlling means operated by said cam gear means for guiding said idler to a central position where said idler will not interfere with components on said upper chassis when said upper chassis is being seated on said lower chassis, and for guiding the pivoting of said idler during tape running operations of said apparatus, said idler controlling means further comprising:

a pin on said idler;

an idler cam having a cam surface, said idler cam biased in a first rotational direction to permit said pin to follow said cam surface as said idler is pivoted to the right and left, said cam surface being contoured so as to facilitate centering of said pin with respect to said cam surface; and eject lever means for pushing said idler cam in an rotational direction opposite said bias direction to substantially lock said pin at a certain position along said cam surface, thereby moving said idler to said central position.

* * * * *